United States Patent
Glowacki et al.

(10) Patent No.: US 6,739,976 B2
(45) Date of Patent: May 25, 2004

(54) PLASTIC BOOT FOR SEALING DOUBLE-TUBE DRIVESHAFT

(75) Inventors: Maciej Glowacki, West Bloomfield, MI (US); Walter J. Golembiewski, Washington, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 10/025,019

(22) Filed: Dec. 19, 2001

(65) Prior Publication Data

US 2002/0132676 A1 Sep. 19, 2002

Related U.S. Application Data

(60) Provisional application No. 60/276,429, filed on Mar. 15, 2001.

(51) Int. Cl.$^7$ .................................. F16C 3/03
(52) U.S. Cl. ..................... 464/175; 464/133; 403/51; 277/636
(58) Field of Search .......................... 464/162, 157, 464/158, 173, 175, 133; 277/636, 637, 638; 403/50, 51

(56) References Cited

U.S. PATENT DOCUMENTS

| | | |
|---|---|---|
| 1,541,007 A | 6/1925 | Thiemer |
| 1,949,500 A | 3/1934 | Swenson |
| 1,950,579 A | 3/1934 | Swenson |
| 2,510,362 A | 6/1950 | Anderson |
| 2,769,457 A | 11/1956 | Wittenberg |
| 3,063,266 A | 11/1962 | Rabson |
| 3,454,182 A | 7/1969 | Morton |
| 3,813,899 A | 6/1974 | Abrahamer |
| 3,942,336 A | 3/1976 | Schultenkamper |
| 4,003,219 A | 1/1977 | Stull |
| 4,084,536 A | 4/1978 | Stansbury |

(List continued on next page.)

FOREIGN PATENT DOCUMENTS

| | | |
|---|---|---|
| DE | 1 475 963 | 2/1965 |
| FR | 1 237 637 | 10/1959 |
| FR | 1 417 355 | 10/1964 |

*Primary Examiner*—Lynne H. Browne
*Assistant Examiner*—Kenn Thompson
(74) *Attorney, Agent, or Firm*—Brinks Hofer Gilson & Lione

(57) ABSTRACT

Boot systems and boot attachment methods are provided to protect a double-tube vehicle driveshaft from premature wear or corrosion. One boot system comprises a boot portion having annular folds, opposite ends, and collar portions. The collar portions adjoin the boot portion at its opposite ends. At least one of the collar portions has a splined portion. The boot system may be utilized in a driveshaft comprising first and second members having splined portions. The second member of such a driveshaft is telescopically resident within the first member, and the splined portion of the first member cooperates with the splined portion of the second member. The boot attachment method involves sliding the boot over at least a part of the first and second members of the driveshaft, and securing the first and second collar portions to the respective first and second members. During this process, the splined portion of at least one of the collar portions cooperates with the splined portion of at least one of the first and second members.

4 Claims, 8 Drawing Sheets

U.S. PATENT DOCUMENTS

| | | | |
|---|---|---|---|
| 4,153,260 A | * | 5/1979 | Joyner .................... 277/500 |
| 4,215,869 A | | 8/1980 | Pendleton |
| 4,308,729 A | | 1/1982 | Condon |
| 4,416,445 A | | 11/1983 | Coad |
| 4,460,182 A | | 7/1984 | Brissette |
| 4,508,522 A | | 4/1985 | Numazawa et al. |
| 4,516,959 A | | 5/1985 | Krude |
| 4,529,213 A | * | 7/1985 | Goodman ................ 277/636 |
| 4,582,484 A | | 4/1986 | Sandor |
| 4,819,755 A | | 4/1989 | Smemo et al. |
| 4,895,391 A | | 1/1990 | Groat |
| 4,945,745 A | | 8/1990 | Bathory et al. |
| 4,957,459 A | | 9/1990 | Snyder |
| 5,027,784 A | | 7/1991 | Osawa et al. |
| 5,230,658 A | | 7/1993 | Burton |
| 5,299,982 A | | 4/1994 | Burton |
| 5,342,282 A | | 8/1994 | Letourneur |
| 5,419,741 A | | 5/1995 | Schwärzler |
| 5,525,112 A | * | 6/1996 | Smith ..................... 464/162 |
| 5,655,968 A | | 8/1997 | Burton |
| 5,716,276 A | | 2/1998 | Mangas et al. |
| 5,752,866 A | | 5/1998 | Takahashi et al. |
| 5,772,520 A | | 6/1998 | Nicholas et al. |
| 5,836,824 A | | 11/1998 | Konegen et al. |
| 5,845,911 A | | 12/1998 | Gimino |
| 5,904,622 A | | 5/1999 | Breese et al. |
| 5,931,738 A | | 8/1999 | Robb |
| 5,961,388 A | * | 10/1999 | Breidenbach et al. ....... 464/133 |
| 6,023,830 A | | 2/2000 | Cole et al. |
| 6,123,622 A | * | 9/2000 | Mikeska et al. ........... 464/172 |
| 6,159,104 A | * | 12/2000 | Mikeska et al. ........... 464/175 |
| 6,179,717 B1 | | 1/2001 | Schwärzler |
| 6,193,612 B1 | * | 2/2001 | Craig et al. ............... 464/162 |
| 6,195,991 B1 | | 3/2001 | De Shon |
| 6,279,221 B1 | | 8/2001 | Glowacki et al. |
| 6,516,829 B1 | | 2/2003 | Townsend et al. |

* cited by examiner

PLASTIC BOOT FOR SEALING DOUBLE-TUBE DRIVESHAFT

RELATED APPLICATIONS

This application claims priority to U.S. Provisional Patent Application No. 60/276,429, filed Mar. 15, 2001, the entirety of which is hereby incorporated herein by reference.

BACKGROUND OF THE INVENTION

Boots for protecting driveshafts have long been known in the art. Such boots are necessary to prevent external elements, such as, water, dirt, or salt from getting into the driveshaft, thereby causing premature wear or corrosion of the system, and system dynamic imbalance.

This invention relates generally to a boot system and boot attachment method for a double-tube "slip-in-tube" splined driveshaft. The concept of a double-tube "slip-in-tube" splined driveshaft is relatively new. Applicant owns U.S. Pat. No. 6,279,221 ("the '221 patent"), issued Aug. 28, 2001, for a double-tube "slip-in-tube" vehicle driveshaft, which is hereby incorporated in full by reference. A double-tube "slip-in-tube" splined driveshaft comprises first and second members each having splined portions. The second member is telescopically resident within the first member, and the splined portion of the first member cooperates with the splined portion of the second member. In such manner, the first and second members cooperatively form the driveshaft. The cooperating splined portions of the first and second members allow external elements to protrude into the double-tube splined driveshaft at the location of the intermeshing splines.

A boot system and boot attachment method, for a double-tube "slip-in-tube" splined driveshaft, is required to prevent such external elements from getting into the driveshaft at the splined cooperating portions of the driveshaft. The boot system must be designed to compensate for extensive driveshaft length changes occurring during compression and decompression cycles of the driveshaft.

BRIEF SUMMARY OF THE INVENTION

It is in general an object of the invention to provide a boot system and boot attachment method to protect a double-tube "slip-in-tube" vehicle driveshaft from premature wear or corrosion.

In one aspect, this invention provides a boot for a driveshaft. The boot comprises a boot portion having annular folds and first and second opposite ends. The boot further comprises first and second collar portions adjoining the boot portion at the first and second opposite ends of the boot portion. Further, at least one of the first and second collar portions has a splined portion.

In another aspect, this invention provides a boot for a driveshaft, wherein the driveshaft comprises first and second members each having splined portions, with the second member being telescopically resident within the first member. The splined portion of the first member cooperates with the splined portion of the second member thereby allowing the first and second members to cooperatively form the driveshaft. The boot comprises a boot portion having annular folds and first and second opposite ends. Further, the boot comprises first and second collar portions adjoining the boot portion at the first and second opposite ends of the boot portion. At least one of the first and second collar portions has a splined portion adapted to cooperate with the splined portion of one of the first and second members.

In yet another aspect, this invention provides a method of attaching a boot to a driveshaft. First, a splined driveshaft is provided comprising first and second members each having splined portions with the second member being telescopically resident within the first member. The splined portion of the first member cooperates with the splined portion of the second member thereby allowing the first and second members to cooperatively form the driveshaft. Next, a boot is provided comprising a boot portion having annular folds and first and second opposite ends. The boot further comprises first and second collar portions adjoining the boot portion at the first and second opposite ends of the boot portion, wherein at least one of the first and second collar portions has a splined portion. Then, the boot is slid over at least a part of the first and second members. The splined portion of the at least one of the first and second collar portions cooperates with the splined portion of at least one of the first and second members. Finally, the first and second collar portions are secured to the respective first and second members of the driveshaft.

The present invention, together with further objects and advantages, will be best understood by reference to the following detailed description taken in conjunction with the accompanying drawings.

DETAILED DESCRIPTION OF THE INVENTION

Figure 1:
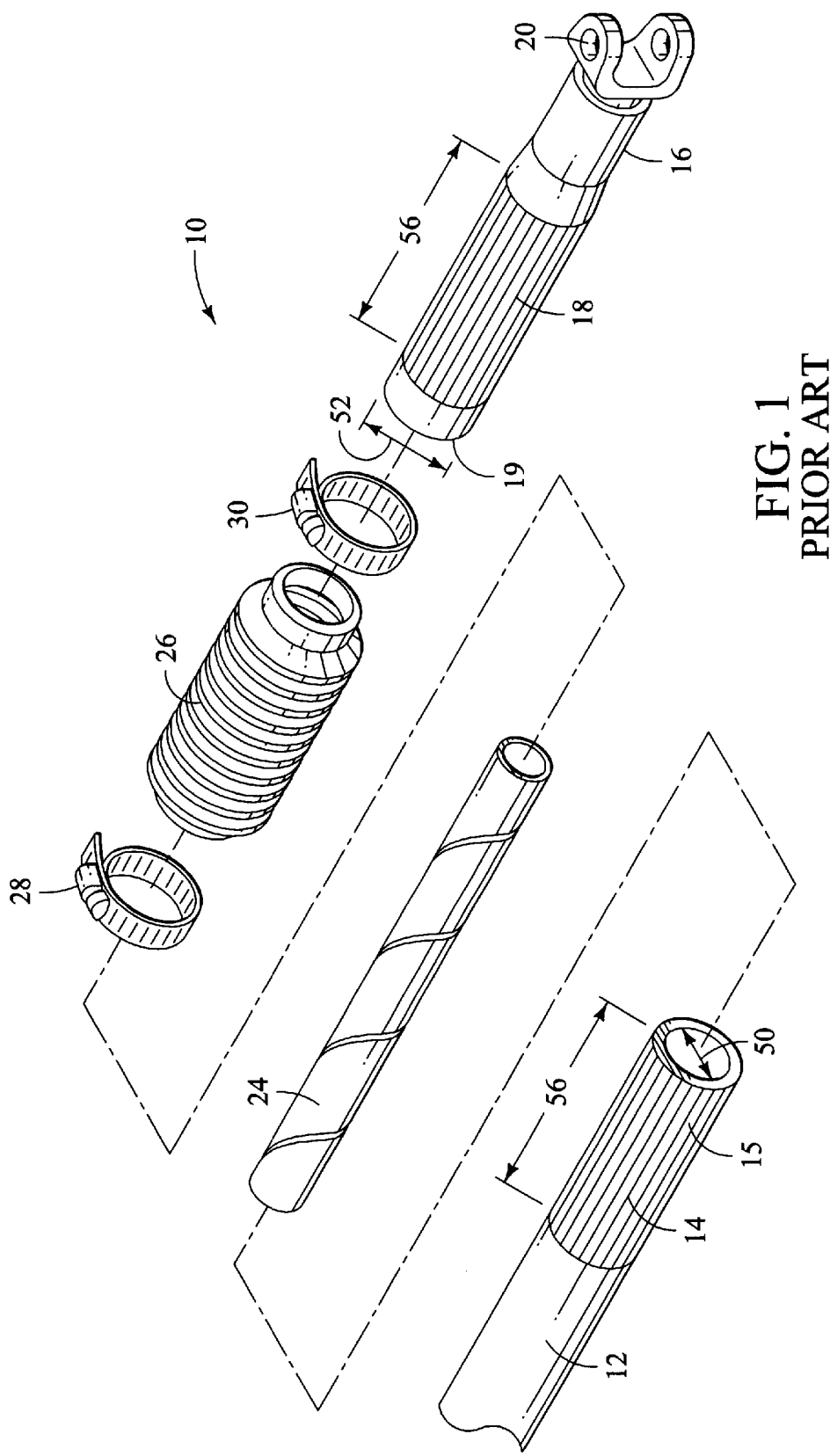
FIG. 1 is an unassembled perspective view of the prior art, for a two-piece slip-in-tube vehicle driveshaft, as shown in the '221 patent.
Figure 2:
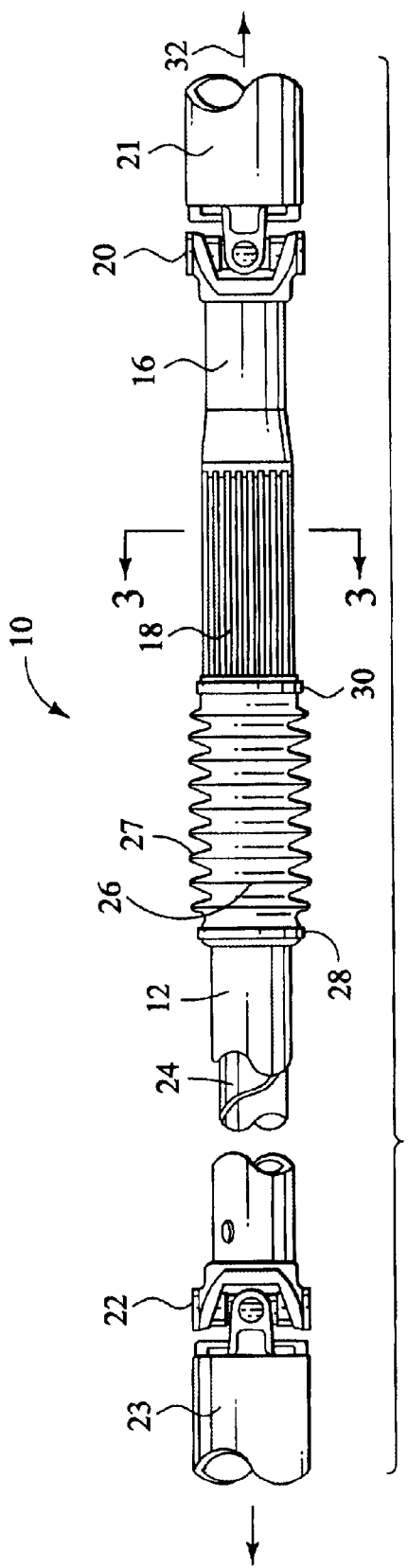
FIG. 2 is an assembled side view of the driveshaft shown in FIG. 1.

Applicant owns U.S. Pat. No. 6,279,221 ("the '221 patent"), issued Aug. 28, 2001, for a double-tube "slip-in-tube" vehicle driveshaft, which is hereby incorporated in full by reference.

Referring to the drawings, FIGS. 1–4 have been incorporated from the '221 patent for a double-tube "slip-in-tube" vehicle driveshaft. As shown, a double-tube "slip-in-tube" vehicle driveshaft 10 includes a generally round and/or tubular, generally hollow first member 16 having a splined portion 18 which is circumferentially formed upon an interior surface 19 of the first member 16. The driveshaft 10 further includes a second generally round and/or tubular, generally hollow member 12 having a splined portion 14 which is circumferentially formed upon an exterior surface 15 of the second member 12. The second member's splined portion 14 is adapted to selectively and cooperatively intermesh with the first member's splined portion 18. The first and second members 16, 12 may have various diameters 52, 50 which in one non-limiting embodiment are respectively equal to about approximately one and three-quarter (1.75) inches to about five (5.0) inches. Other larger diameter values may be utilized.

The second member 12 is adapted to selectively, movably, and telescopically penetrate the first member 16. The splined portions 18, 14 of the first and second members 16, 12 cooperatively intermesh in the usual and known manner. Particulary, the first member 16 is coupled by the use of a conventional flange 20 to a conventional transmission 21, while the second member 12 is coupled, by the use of a conventional flange 22, to a conventional differential 23. The torque is communicated to the first member 16 and then, by use of the intermeshed splined portions 18, 14 of the first and second members 16, 12, is communicated to the second member 12. The cooperating splined portions 18, 14 allow the second member 12 to dynamically move along the longitudinal axis of symmetry 32 of the driveshaft 10 in response to changes in the distance between the transmission 21 and the differential 23, in a known manner.

The first and second members 16, 12 may be manufactured from conventional and commercially available lightweight aluminum material which may comprise a commercially available "6061-T4" type of aluminum or aluminum alloy material. The splines are "cold formed" upon the surfaces 19, 15 by the use of the conventional "Grob" process, which is provided by the Ernst Grob AG company of Mannedorf, Switzerland. Moreover, the splined portions 18, 14 of the first and second members 16, 12 are selectively hardened or "anodized" in accordance with the commercially available Metalast anodizing process which is provided by the Metalast International corporation of Minden, Nev. More particularly, the splined portions 18, 14 of the first and second members 16, 12, in one embodiment, are anodized with a layer of "Metalast hardcoat" material having a thickness of about 0.002".

Figure 4:
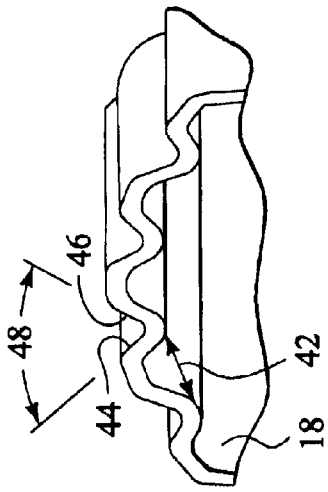
FIG. 4 is a fragmented perspective view of the portion of the driveshaft which is shown in FIG. 3 and which illustrates portions of the splines, which are used and/or selectively formed upon the vehicle driveshaft of a preferred embodiment.
Figure 3:
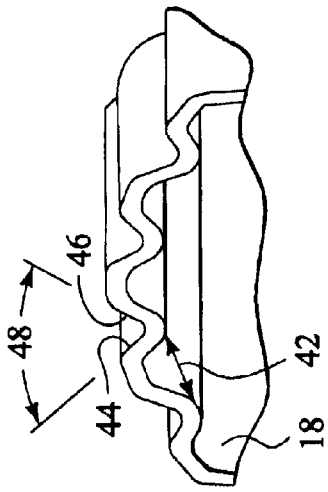
FIG. 3 is a side view of the driveshaft shown in FIG. 2, taken along view line 3—3.

The use of such anodized aluminum and cold-formed splined portions 18, 14 allows for a relatively lightweight driveshaft 10 which substantially reduces the amount of vibration and noise which emanates from the operatively formed driveshaft 10. The relatively lightweight aluminum construction allows the first and second members 16, 12 to have relatively large diameters 52, 50, while providing a significant decrease in the overall weight relative to prior driveshafts. These relatively large diameters members 16, 12 efficiently distribute the applied axial loads over a larger surface area, thereby allowing the driveshaft 10 to support relatively larger torques at relatively higher speeds than prior driveshaft assemblies. Further, this relatively lightweight design allows for relatively long splined portions 18, 14 which, in one embodiment may have a substantially identical length 56 equal to at least and approximately three times the diameter 52 of the first member 16 (e.g., approximately 13.5 inches). In other non-limiting embodiments, the splined portions 18, 14 have lengths which respectively extend approximately half way along the first and second members 16, 12 or have respective lengths equal to approximately three times their respective diameter. The anodized aluminum splines also, as is best shown in FIGS. 3 and 4, allow for relatively large and/or wide splined mating surfaces and/or "working areas" (e.g., which in one non-limiting embodiment have a "tooth thickness" 42 equal to about five to about ten millimeters). These wide splines allow for better distribution of the axial loads imparted upon the spine portions 18, 14 and are effective to reduce the overall wear of the splines and the assembly 10, thereby substantially increasing the "working" or "operating" life of the driveshaft 10.

In one non-limiting embodiment, each end wall 44, 46 of each spine cooperatively forms an angle 48 of about forty degrees (40°) to eighty degrees (80°), although other angular configurations may be utilized. Further, while a segment of the splined portion 18 of the first member 16 is shown in FIG. 3, it should be realized that the splined portion 14 of the second member 12 is substantially similar. It should be appreciated that these relatively long intermeshing portions 18, 14 reduce the amount of noise and/or vibrations generated from the driveshaft 10. Additionally, these relatively long splined intermeshing portions 18, 14 reduce the probability that the driveshaft 10 will undesirably buckle in a collision, thereby increasing the overall safety of the vehicle. Further, these relatively lightweight first and second members 16, 12 having relatively long respective splined portions 18, 14, allow for the creation of a relative stiff and lightweight driveshaft. In one embodiment, the use of such a driveshaft may replace and/or substantially shorten the elongated transmission extension member 21.

The prior art double-tube "slip-in-tube" vehicle driveshaft 10, as shown in FIGS. 1–4, requires an effective boot system and boot attachment method to prevent external elements, such as water, dirt, or salt, from penetrating the driveshaft 10. At the same time, the boot system preferably should be designed to compensate for extensive driveshaft length changes associated with such a driveshaft 10. Such a sealing system and sealing method is particularly required along the splined portions 18, 14 of the first and second members 16, 12 to prevent such external elements from protruding into the driveshaft 10 as the splined portions 18, 14 cooperatively intermesh during compression and decompression plunging motions of the driveshaft 10.

Figure 5:
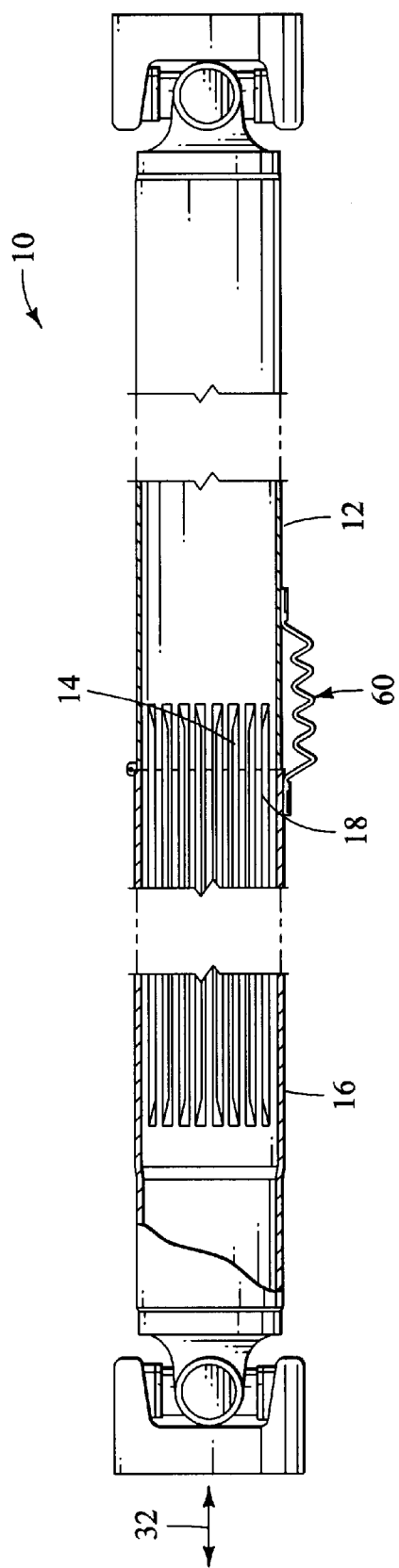
FIG. 5 is an assembled side view of the driveshaft shown in FIG. 1 incorporating one embodiment of the boot of the present invention.
Figure 7:
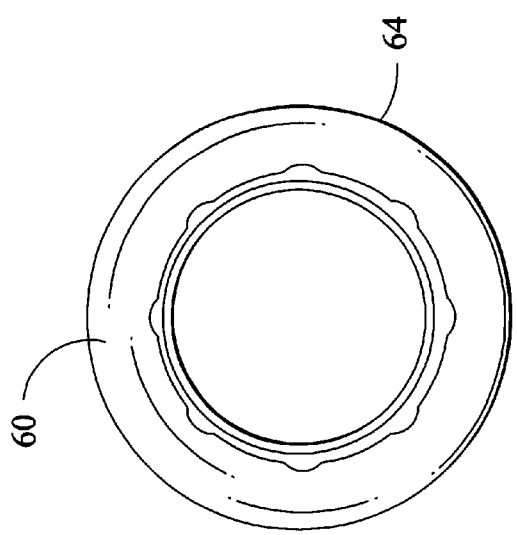
FIG. 7 is a side view of the boot shown in FIG. 6.
Figure 6:
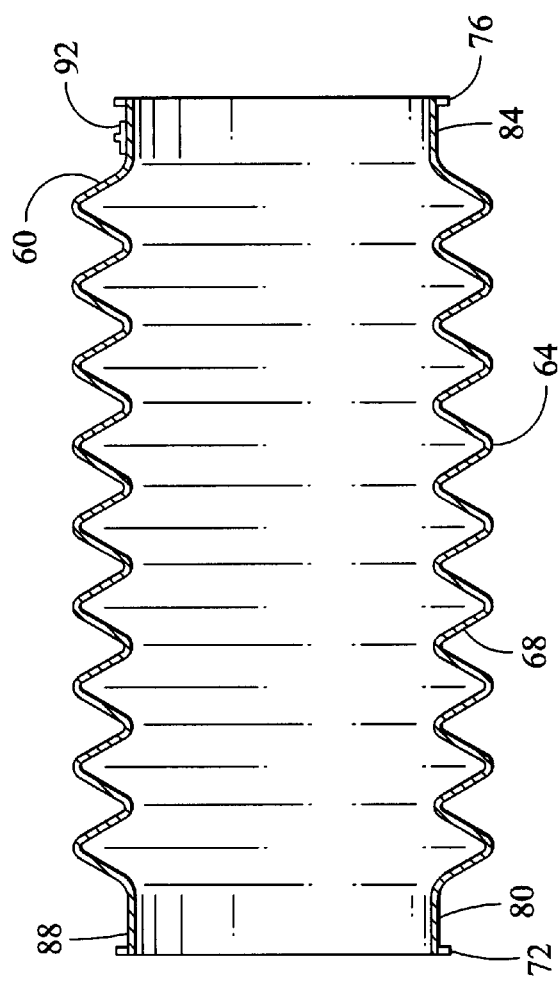
FIG. 6 is a front view of one embodiment of the boot of the present invention.

FIG. 5 shows the boot 60 of the instant invention installed on a double-tube vehicle driveshaft 10 having first and second members 16, 12 with cooperating spline portions 18, 14. The exemplary embodiment of the boot 60 is shown in FIGS. 6 and 7. The boot 60 is generally round and/or tubular, and hollow. Preferably, the boot is made of a relatively sturdy plastic in order to prevent the boot from ballooning in high-speed driveshaft rotation. However, other materials such as rubber may be utilized. The boot 60 includes a boot portion 64 having annular folds 68. The annular folds 68 allow for the boot 60 to change its length, in a range of more than plus or minus one inch (+/−1"), to accommodate for variations in the driveshaft 10 length occurring during compression and decompression cycles. The boot 60 also includes first and second opposite ends 72, 76. Adjoining the first and second opposite ends of the boot 60 are first and second annular collar portions 80, 84. First and second generally annular channels 88, 92 are formed within the first and second annular collar portions 80, 84.

Figure 9:
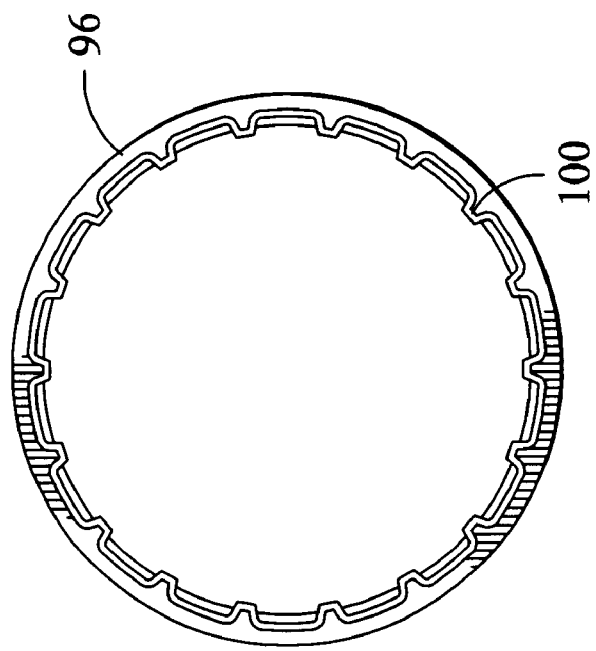
FIG. 9 is a side view of the boot insert shown in FIG. 8.
Figure 8:
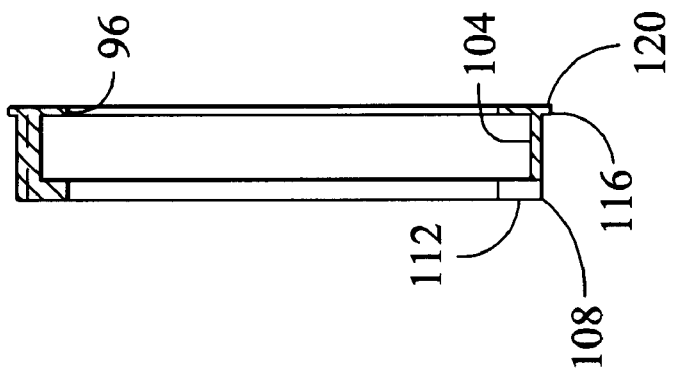
FIG. 8 is a front view of one embodiment of the boot insert of the present invention.
Figure 11:
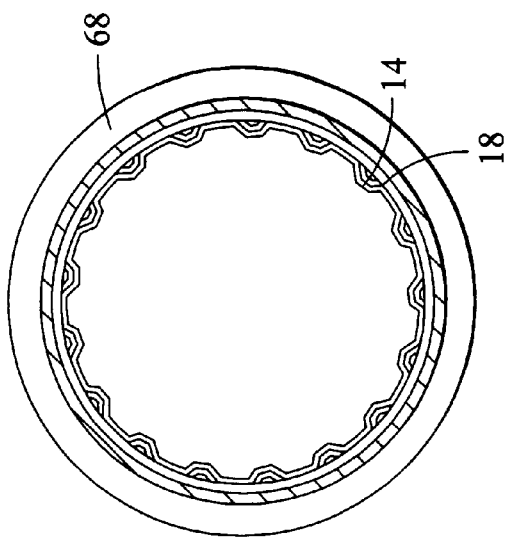
FIG. 11 is a cut-away side view of the embodiment of FIG. 10, taken along view line A—A.
Figure 10:
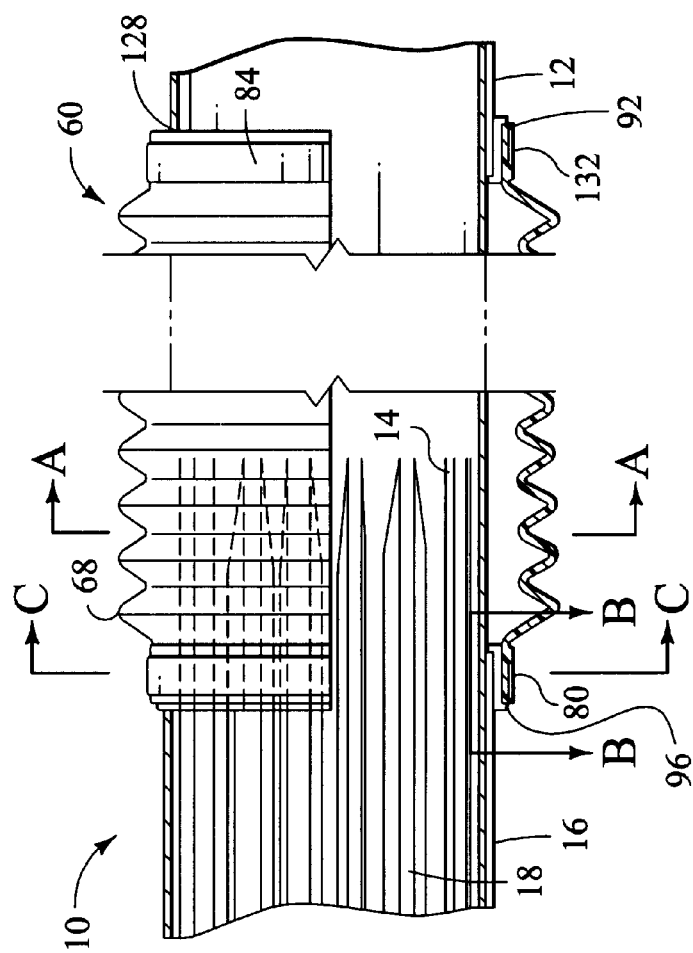
FIG. 10 is an enlarged partial side view of the driveshaft shown in FIG. 1 incorporating one embodiment of the boo t of the present invention.
Figure 13:
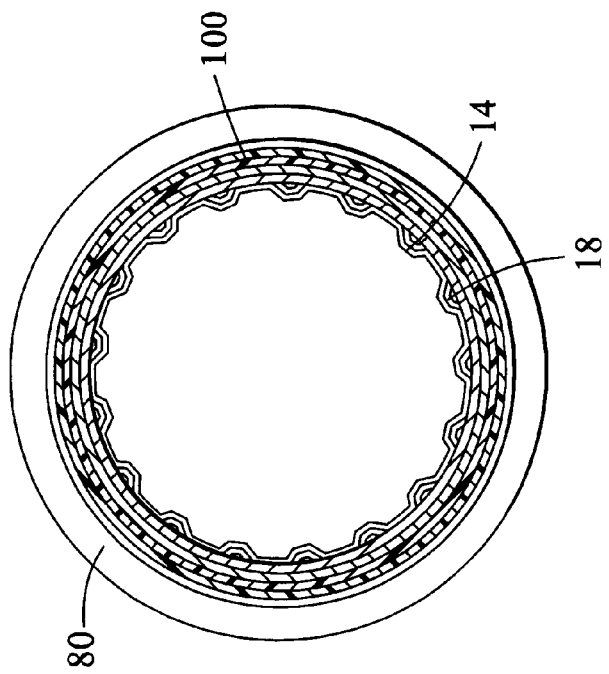
FIG. 13 is a cut-away side view of the embodiment of FIG. 10, taken along view line C—C.
Figure 12:
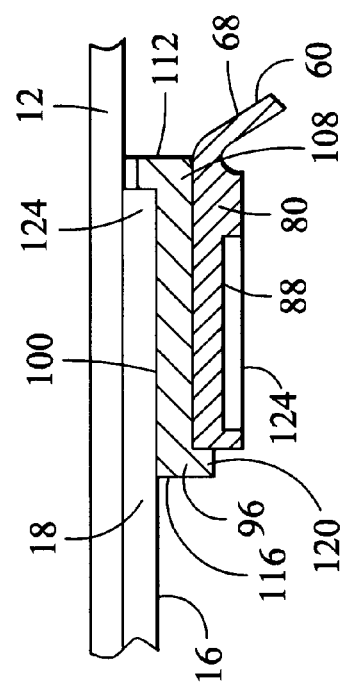
FIG. 12 is a cut-away partial front view of the embodiment of FIG. 10, showing the attachment of the boot to the first and second members of the driveshaft, taken at one point of the boot along view line B—B.

In one embodiment, a splined insert 96, as shown in FIG. 8, is provided to enable one or more of the first and second annular collar portions 80, 84 to be air-tightly fit to one or more of the splined portions 18, 14 of the first and second members 16, 12. As shown in FIGS. 8 and 9, the splined insert 96 has a splined portion 100 circumferentially formed upon an interior surface 104 of the insert 96. The splined insert 96 is generally round and/or tubular, and hollow. The splined insert 96 is preferably manufactured from soft, compliant plastic. However, other flexible materials such as rubber may be used. At one end 108 of the insert 96, an annular lip 112 extends inwardly around the circumference of the insert 96. At the other end 116 of the insert 96, another annular lip 120 extends outwardly around the circumference of the insert 96.

The attachment of the boot 60 and splined insert 96 to a double-tube vehicle driveshaft 10, having first and second members 16, 12 with cooperating spine portions 18, 14, is shown in FIGS. 10–13. The splined insert 96 is mounted to at least part of the splined portion 18 of the first member 16 of the driveshaft 10. An end 124 of the first member 16 abuts against the inwardly extending annular lip 112 at the end 108 of the insert 96. The splined portion 100 of the splined insert 96 cooperatively meshes with the splined portion 18 of the first member 16. The boot 60 is mounted with the driveshaft 10 utilizing the splined insert 96. The first annular collar portion 80 of the boot 60 is fit over at least a portion of the splined insert 96. As shown, the first annular collar portion 80 abuts against the annular lip 120 at an end 116 of the insert 96. A clamp 124 is utilized to secure the first annular collar portion 80 of the boot 60 to the first member 16 of the driveshaft 10. The clamp 124 fits within the first generally annular channel 88 around the first annular collar portions 80 to secure the boot 60 in place.

The second annular collar portion 84 of the boot 60 is secured directly to a non-splined round portion 128 of the second member 12 without the use of a splined insert. A clamp 132 is then utilized to secure the second annular collar portion 84 of the boot 60 directly to the second member 12. The clamp 132 fits within the second generally annular channel 92 around the second annular collar portion 84 to secure the boot 60 in place. In other embodiments, splined inserts may be utilized at both ends of the boot to secure both ends to splined portions of the driveshaft. The splined inserts may be glued inside the collar portions or alternatively left as separate components inside the boot. In other embodiments, instead of utilizing splined inserts, the collar portions may have splined portions themselves to directly conform to the splined portions of the driveshaft members.

Once the boot 60 is secured to the driveshaft 10, by securing the first annular collar portion 80 to the first member 16 and securing the second annular collar portion 84 to the second member 12, the second member 12 is allowed to freely expand and contract within the first annular collar portion 80. As the second member 12 expands and contracts, the second annular collar portion 84 secured to the second member 12 likewise expands and contracts. During this process, the annular folds 68 allow the boot 60 to change its length. In such manner, the boot 60 accommodates compression and decompression cycles of the driveshaft 10, while preventing harmful, external elements from penetrating the driveshaft 10.

Figure 14:
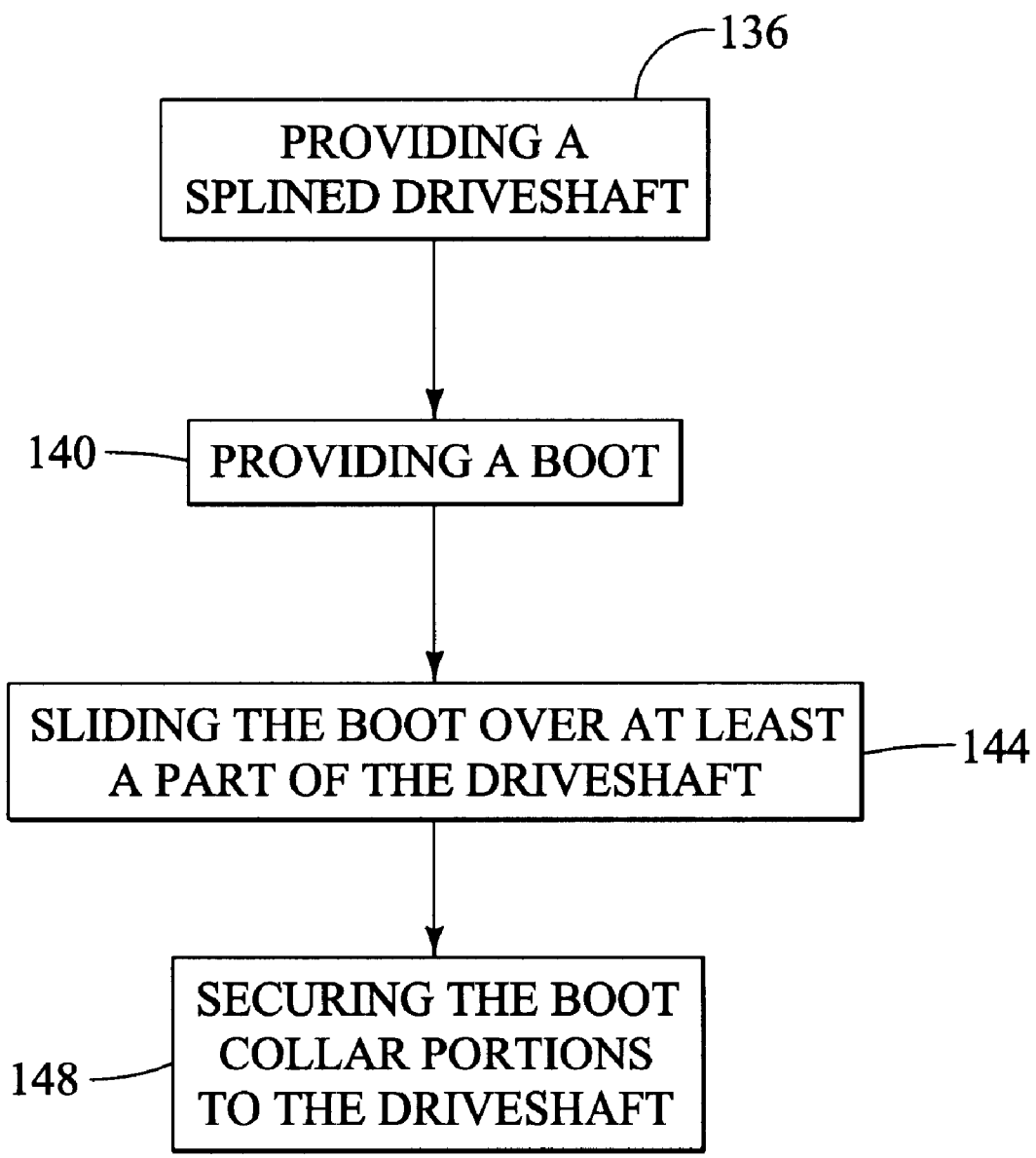
FIG. 14 is a flow diagram illustrating one exemplary method in accordance with the present invention.

FIG. 14 shows a method of installing a boot on a double-tube "slip-in-tube" vehicle driveshaft. First, a splined driveshaft is provided 136. The splined driveshaft comprises first and second members each having splined portions, with the second member being telescopically resident within the first member. The splined portion of the first member cooperates with the splined portion of the second member to allow the first and second member to cooperatively form the driveshaft. A boot is then provided 140. The boot comprises a boot portion having annular folds, first and second opposite ends, and first and second collar portions adjoining the boot portion at its first and second opposite ends. At least one of the first and second collar portions has a splined portion. The splined portion may comprise a separate, plastic splined insert at least partially within one of the first and second collar portions. Such a separate splined insert may be glued to one of the first and second collar portions. The boot is then slid over at least a part of the first and second members of the driveshaft 144. The boot is preferably plastic. The splined portion of at least one of the first and second collar portions cooperates with the splined portion of at least one of the first and second members of the driveshaft. Such a fit is preferably airtight. Finally, the first and second collar portions are secured to the respective first and second members of the driveshaft 148. The first and second collar portions may be secured to the first and second members utilizing a clamp, or other attachment means such as snap-fits.

It is to be understood that the invention is not to be limited to the exact construction and/or method which has been illustrated and discussed above, but that various changes and/or modifications may be made without departing from the spirit and the scope of the invention.

What is claimed is:

1. A driveshaft assembly comprising:
   a shaft including a first member having a splined inner surface, and including a second member having a splined outer surface adapted to telescopically slide into and rotationally engage said splined inner surface of said first member;
   an insert formed of a first, relatively soft, compliant material, said insert having a splined inner surface adapted to telescopically slide over and seal against said splined outer surface of said second member; and
   a boot member formed of a second, relatively sturdy material adapted to resist ballooning in response to centrifugal forces generated during high-speed rotation of said shaft members, said boot including a first collar portion adapted to seal against said insert, including a second collar portion adapted to seal against said first member, and including a boot portion having annular folds and extending between said first collar portion and said second collar portion.

2. The driveshaft assembly of claim 1 further comprising a first clamp located over said first collar portion and adapted to secure said first collar portion to said insert and to radially bias the material of said insert against said splined outer surface of said second member.

3. The driveshaft assembly of claim 1 wherein said insert has at least one annular lip adapted to limit relative motion between said first collar portion and said insert.

4. The driveshaft assembly of claim 3 wherein said insert has a second annular lip adapted to prevent relative motion between said first collar portion and said first member.

* * * * *